United States Patent
Pekonen

(10) Patent No.: US 7,039,071 B2
(45) Date of Patent: May 2, 2006

(54) METHOD AND DEVICE FOR TRIGGERING AN UPLINK TRANSMISSION AT A CORRECT TIME INSTANT

(75) Inventor: Harri Pekonen, Raisio (FI)

(73) Assignee: Nokia Corporation, Espoo (FI)

( * ) Notice: Subject to any disclaimer, the term of this patent is extended or adjusted under 35 U.S.C. 154(b) by 1037 days.

(21) Appl. No.: 09/736,111

(22) Filed: Dec. 13, 2000

(65) Prior Publication Data

US 2001/0005907 A1    Jun. 28, 2001

(30) Foreign Application Priority Data

Dec. 17, 1999  (FI) .................................. 19992718

(51) Int. Cl.
*H04J 3/06* (2006.01)
(52) U.S. Cl. ...................... 370/509; 370/522
(58) Field of Classification Search ................ 370/516, 370/522, 442, 595.1, 509, 503, 342, 33.5, 370/207, 208, 210, 468, 510, 512, 458, 490, 370/335, 474, 395.42
See application file for complete search history.

(56) References Cited

U.S. PATENT DOCUMENTS

| | | |
|---|---|---|
| 5,666,358 A | 9/1997 | Paratore et al. |
| 5,793,772 A | 8/1998 | Burke et al. |
| 5,943,604 A | 8/1999 | Chen et al. |
| 6,032,181 A * | 2/2000 | Bedgedjian et al. ........ 370/509 |
| 6,091,440 A * | 7/2000 | Kokkinen ................... 725/149 |
| 6,526,070 B1 * | 2/2003 | Bernath et al. ............. 370/509 |
| 6,553,040 B1 * | 4/2003 | Bernath et al. ............. 370/509 |
| 6,556,591 B1 * | 4/2003 | Bernath et al. ............. 370/509 |
| 6,698,022 B1 * | 2/2004 | Wu ............................. 725/111 |
| 6,889,051 B1 * | 5/2005 | Ogino et al. ............. 455/456.1 |

FOREIGN PATENT DOCUMENTS

EP        0825772        2/1998

OTHER PUBLICATIONS

"The European Telecommunication Standard No. ETS 300 800" (DVB-RC (Digital Video Broadcasting-Return Channel).

* cited by examiner

*Primary Examiner*—Hassan Kizou
*Assistant Examiner*—Ricardo Pizarro
(74) *Attorney, Agent, or Firm*—Alfred A. Fressola; Ware, Fressola, Van Der Sluys & Adolphson LLP

(57) ABSTRACT

A method and a device are provided for triggering an uplink transmission in a cable modem. A number of time indicators (301) are received in a downlink direction. There is established knowledge about a total time offset related to propagation delays in a network from which the time indicators are received. There is also established knowledge about an allocated uplink transmission slot number determined in relation to the received time indicators. The total time offset is reduced into a remainder value that is smaller than the total time offset. A shifted slot counter (304, 405) is synchronized to a shifted time base (302, 303) which has an offset to the time base provided by the received time indicators (301), said offset being equal to said remainder value. An uplink transmission triggering signal is generated as a response to said shifted slot counter (405) giving a certain slot number.

10 Claims, 2 Drawing Sheets

METHOD AND DEVICE FOR TRIGGERING AN UPLINK TRANSMISSION AT A CORRECT TIME INSTANT

TECHNICAL FIELD

The invention generally concerns the technology of determining the correct transmission moment for a scheduled uplink transmission. Especially the invention concerns such determination in an arrangement where the transmission moment is scheduled in relation to a certain regular synchronization signal.

BACKGROUND OF THE INVENTION

The European Telecommunications Standard number ETS 300 800, known also as the DVB-RC (Digital Video Broadcasting-Return Channel) standard and compliant with the DAVIC (Digital Audio-Visual Council) 1.4 standard, lays down the general framework for implementing an uplink transmission channel as a part of bidirectional communication over a cable television network. An apparatus known as the cable modem, which is a basically known part of the terminal arrangement located at e.g. a private home, is allowed to emit transmissions in the uplink direction according to a certain schedule. A centrally located device known as the head-end composes the uplink transmission schedule and communicates the allocated uplink transmission time intervals to the cable modems. The messages that comprise these allocations are known as MAC or Media Access Control messages, and they are complemented by the information of MAC Flags included in the downlink transmission.

FIG. 1 illustrates some known aspects of the timing of the uplink transmissions. The downlink transmission which the cable modems are listening to contains a synchronization signal which comprises time indicators or markers 101 that occur regularly with one or three millisecond intervals. The downlink transmission may come either in an out-of-band (OOB) or in-band (IB) form, which makes a small difference to the implementation of the markers 101. An OOB downlink transmission consists of a continuous stream of downlink data structures known as SL-ESFs (Signalling Link Extended Superframes). Each SL-ESF contains 4632 bits, of which bits number 0, 1544 and 3088 are available as marker bits. The use of these bits differs slightly depending on the data rate of the OOB downlink transmission, but basically the moment of occurrence of a certain downlink bit constitutes the marker. An IB downlink transmission consists of so-called MPEG2-TS packets where a certain upstream slot marker pointer indicates the number of symbol clock cycles between the first symbol of the next synchronization byte and the next 3 ms marker.

Several upstream slot rates are available depending on the upstream data rate to be utilized. The upstream data rate may be 256 kbit/s, 1.544 Mbit/s, 3.088 Mbit/s or 6.176 Mbit/s, corresponding to slot rates of 500, 3000, 6000 or 12 000 upstream slots/s respectively. If we consider the markers to occur at 1 ms intervals, each time interval between two successive markers 101 may comprise half, three, six or twelve allocatable uplink transmission slots. In FIG. 1 the division of one such time interval into six uplink slots S0 to S5 is shown as an example. The upstream slots are numbered according to a certain cyclic numbering scheme which is derived from the downstream frame numbers which are included in the downstream frames. More specifically, the downlink frames comprise a set of so-called M-bits M10–M1 which constitute a register the value of which is incremented by one every 3 ms. The maximum value for the register is calculable from a certain MAC Default Configuration element and the upstream data rate. After the maximum value the register returns to zero. The upstream slot numbers that are valid during a certain 3 ms period are calculated from the register value received during the immediately preceding 3 ms period by multiplying the register value with integer multipliers which are associated with the upstream data rate.

Setting up an uplink connection between a cable modem and the head-end requires some exchange of MAC messages. For the purposes of the invention it is important that when a cable modem responds to the head-end with a certain MAC Sign-On Response message, the head-end calculates certain time offset values which the cable modem should use to correct its uplink transmission timing. In a single-cast MAC Ranging and Power Calibration message to the cable modem the head-end transmits two indicator values known as the Absolute_time_offset and the Time_offset. The range of both offset indicators is ±3 milliseconds with a step size of 100 nanoseconds. Several rounds of calibrating may be needed to find the correct values for the Absolute_time_offset and the Time_offset indicators. Some further exchange of messages completes the sign-on and calibration phase.

When the head-end wants to assign an uplink transmission slot to a certain cable modem, it transmits a certain MAC Connect message where it uses a specific indication scheme to announce to the cable modem the first upstream slot number in which it may begin transmitting, the number of successive assigned slots following the first slot, the cyclic or listed occurrence of following similar slot allocations and the last slot number which the cable modem may use for uplink transmissions. Because the uplink slot numbers are defined in relation to downlink frame numbers, and because the uplink slot positions are synchronized to the markers given within the downlink frames, the cable modem has thereafter all the information it needs to trigger its uplink transmission(s) at exactly given moment(s).

It follows from the known relations between the downlink frame numbers, the location of the markers within the downlink frames and the downlink-uplink synchronization that the assignment of a certain uplink slot determines a certain marker to be used as a reference point. This marker has been designated in FIG. 1 as the zero point 102 in the time base laid down by the markers. The defined maximum ranges of the Absolute_time_offset and Time_offset indicators mean that the actual transmission moment or the allocated uplink slot may be located anywhere within the 12 millisecond interval which lies symmetrically around the reference point 102. It is on the responsibility of the cable modem to decode the allocation of its uplink transmission slot and to trigger the uplink transmission so that it takes place within the limits of the allocated slot.

In practice the range of available offsets may be shorter on the negative offset side (to the left from the reference point 102 in FIG. 1) than 6 milliseconds, because the MAC message/MAC Flags that contains the allocation may come less than 6 milliseconds before the time indicator that is used as the reference point. However, in order to fulfil the standard's requirements the cable modem must be able to time its uplink transmission to any point of time within said 12 ms interval, with offset timing steps of 100 nanoseconds, as defined by the head-end. The required accuracy in triggering the uplink transmission is ±0.625 symbol durations with selected transmission rate.

A microprocessor controls all operations of the cable modem, so in principle it would be possible to instruct the microprocessor to generate a triggering signal to the uplink transmitter in the cable modem so that the uplink transmission would take place exactly at a given moment. However, it is difficult to realize any external triggering with a microprocessor to the required accuracy.

A known hardware-based solution is to have in the cable modem a slot counter that is synchronized to the actual occurrence of the markers seen by the cable modem. In other words the slot counter does not take into account the offset values (the Absolute_time_offset and Time_offset indicators). Additionally a known cable modem contains a number of offset counters. Each offset counter ticks at steps of 100 ns throughout the whole 12 ms interval described above if required. Each offset counter is initialized to give a transmission triggering signal at a time instant that differs from the nominal position of an allocated slot by a time which corresponds to the given Absolute_time_offset and Time_offset values. Since the cable modem must be ready to transmit in each and every uplink transmission slot, and since the maximum number of uplink transmission slots is 12 per millisecond (when the uplink data rate is 6.176 Mbit/s), a total of 12×12=144 offset counters is required.

FIGS. 2a and 2b illustrate the principles of the above-described conventional hardware-based solution. Each offset counter in the offset counter block 201 is reset with an initialization instruction that makes the counter to expire after the combined length of time given by the Absolute_time_offset and Time_offset indicators. The slot counter 203 counts all the time and is synchronized to the markers, of which there is specificallyt shown a marker 202 that marks the beginning of the 12 ms interval referred to above. At the occurrence of each allocated slot, as given by the slot counter 203, an offset counter is started: when that offset counter expires, it gives an expiration signal which acts as the triggering instruction to the uplink transmitter 204.

Not only is the offset counter block 201 physically large in terms of required circuit area within an integrated circuit implementation, but also the accuracy requirements of the clock pulse that is used to advance the counters become quite stringent.

SUMMARY OF THE INVENTION

It is an object of the present invention to provide a method and an arrangement for determining the uplink transmission moment for cable modems and similar apparatuses in a way that is more advantageous than the discussed prior art alternatives. Especially it is an object of the invention to provide a method and an arrangement that are modest in complexity and accuracy requirements. Additionally it is an object of the invention to provide a circuit implementation that is physically small.

The objects of the invention are achieved by using a two-stage counter where a first stage that shifts the slot counting in relation to the synchronization pulses and that the second stage determines a certain time slot in the shifted slot counting domain.

The method according to the invention is characterized in that it comprises the steps of
  reducing a total time offset into a remainder value that is smaller than the total time offset
  synchronizing a shifted slot counter to a shifted time base which has an offset to the time base provided by certain received time indicators, said offset being equal to said remainder value, and generating an uplink transmission triggering signal as a response to said shifted slot counter giving a certain slot number.

The invention applies also to a device which is characterized in that it comprises
  time indicator offset counting means for generating a shifted time base which has an offset to the time base provided by certain received time indicators
  a slot counter coupled to said time indicator offset counting means so as to synchronize itself to said shifted time base, and
  triggering signal generating means coupled to said slot counter for generating an uplink transmission triggering signal from the result given by said slot counter.

Additionally the invention applies to a cable modem which is characterized in that it comprises
  time indicator offset counting means for generating a shifted time base which has an offset to the time base provided by certain received time indicators
  means for adjusting an allocated uplink transmission slot number to take into account the difference between the total time offset and an offset which said shifted time base has in relation to the time base provided by the received time indicators
  a slot counter coupled to said time indicator offset counting means so as to synchronize itself to said shifted time base, and
  triggering signal generating means coupled to said slot counter for generating an uplink transmission triggering signal from the result given by said slot counter and;

where at least one of said slot counter and said triggering signal generating means is responsive to the output of said means for adjusting the allocated uplink transmission slot number.

It is important to note that the time offsets which are indicated through the Absolute_time_offset and Time_offset indicators are common to all uplink transmissions which the cable modem must produce. Therefore it is advantageous to shift the whole uplink slot counting scheme in the cable modem in relation to the timebase laid down by the markers that come from the head-end, instead of counting individual time offsets for single slots.

The size of the offset counter that shifts the slot counting scheme, as well as the accuracy required from it, may be kept at a minimum if the offset timing is reduced to the shortest possible time interval that still contains a marker received from the head-end. In other words, even if the absolute offset sum given by the Absolute_time_offset and Time_offset indicators may be as large as 6 milliseconds, it suffices to have an offset counter the maximum range of which equals the time interval between successive markers, i.e. 1 millisecond. The number of integer milliseconds deducted from the absolute offset sum given by the Absolute_time_offset and Time_offset indicators is compensated for in the initialization of the slot counter.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BEST MODE FOR CARRYING OUT THE INVENTION

Figure 1:
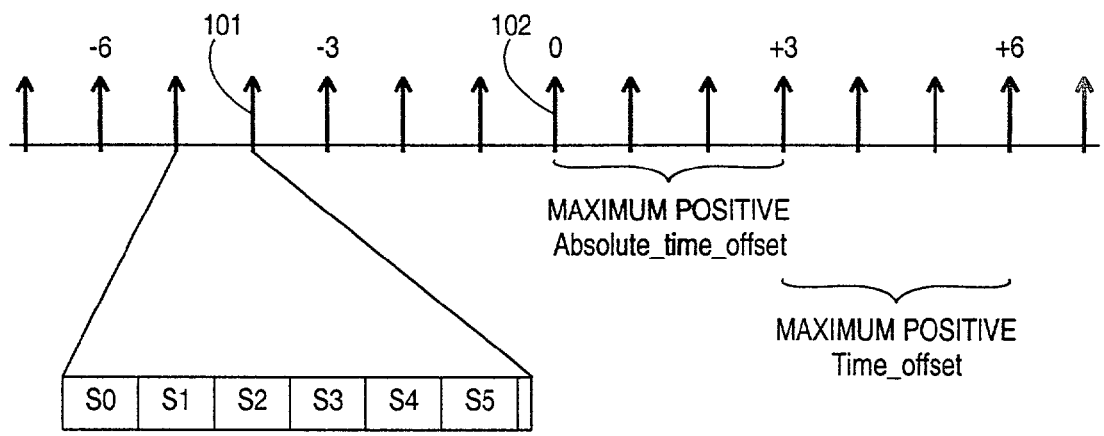
FIG. 1 illustrates some known aspects of the timing of the uplink transmissions for cable modems.
Figure 2A:
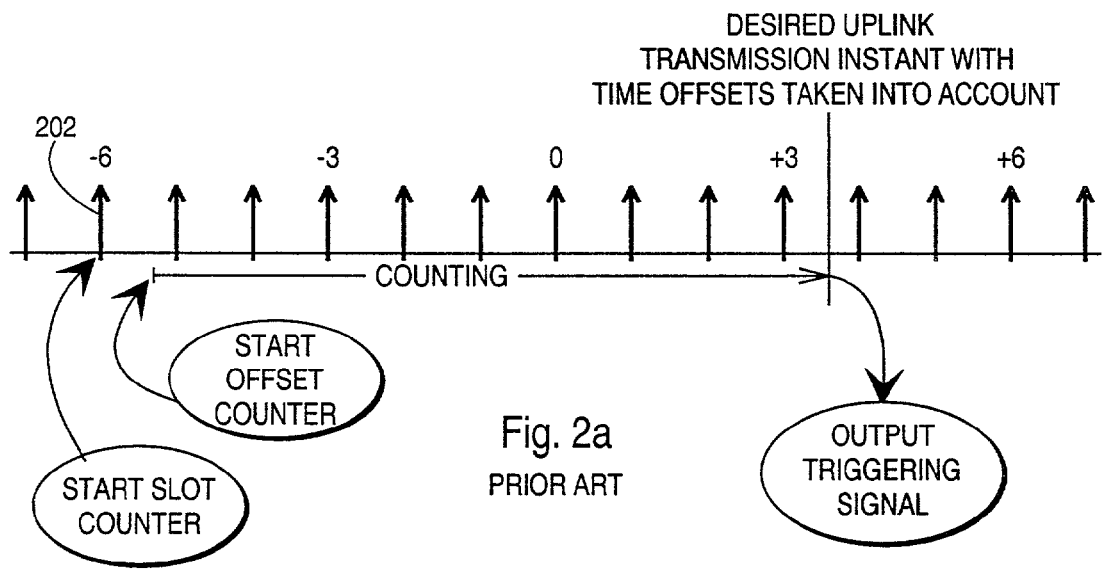
FIGS. 2a and 2b illustrate the structure and operation of a conventional hardware-based solution.
Figure 2B:
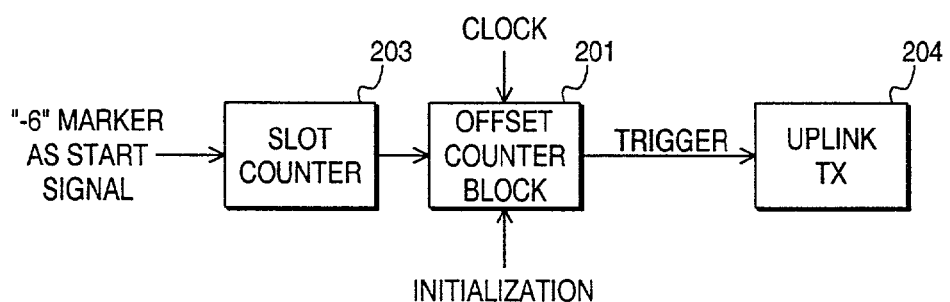
Figure 3:
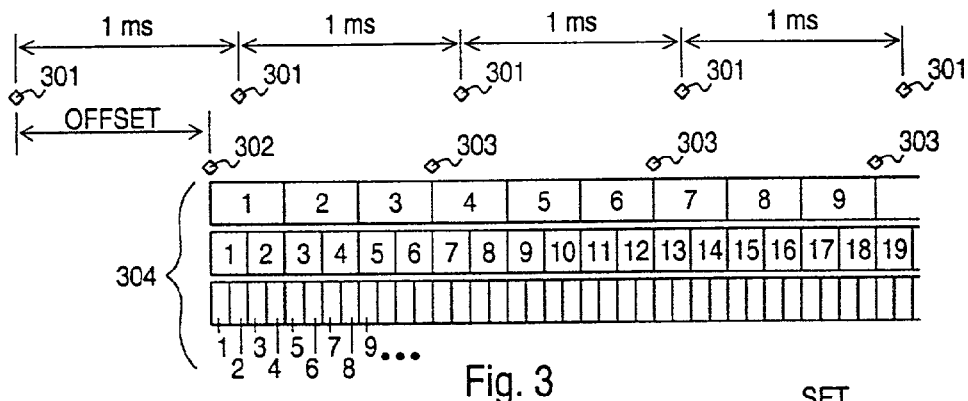
FIG. 3 illustrates a timing principle in accordance with the present invention.
Figure 4:
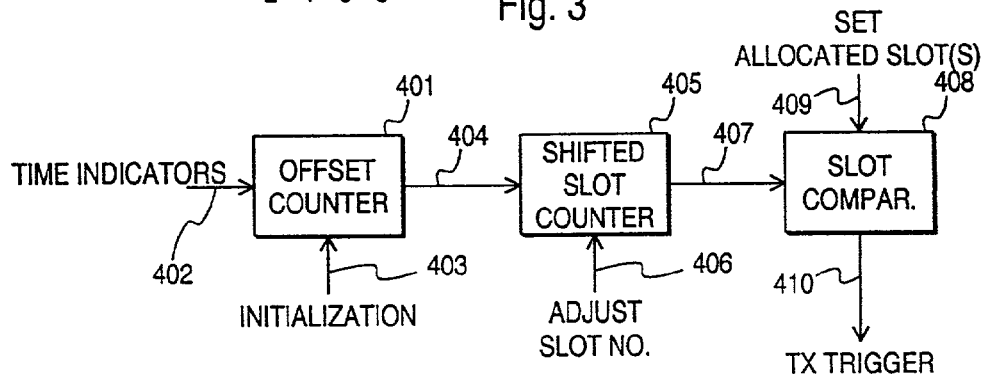
FIG. 4 illustrates an advantageous hardware implementation and FIG. 5 illustrates a cable modem according to an embodiment of the invention.
Figure 5:
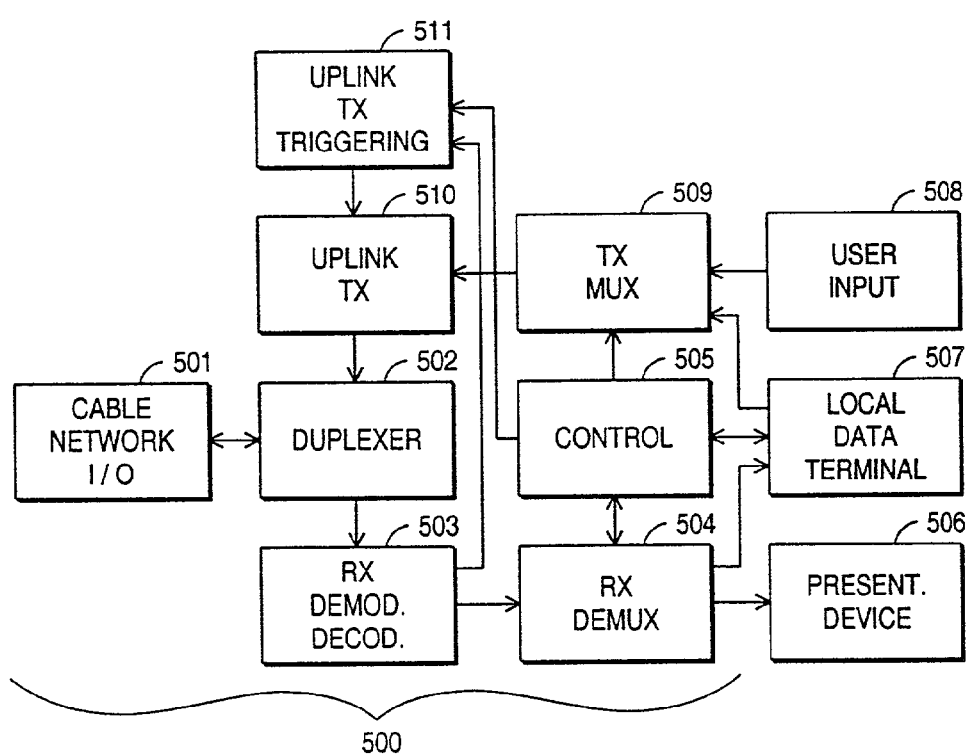

FIGS. 1 to 2b have been dealt with above within the description of prior art, so the following discussion of the invention and its embodiments focuses on FIGS. 3 to 5.

FIG. 3 illustrates a timing principle where the timebase is determined by the regularly occurring time indicators 301. The invention does not require the applicability of especially the DVB-RC or DAVIC 1.4 standards, but for consistency of description we may assume that the time indicators 301 are the markers that come with constant 1 ms intervals in the downlink direction from a head-end. The range within which the timing of any number of uplink transmissions must be determined covers symmetrically 6 time indicator intervals to the positive and negative directions from a certain zero point. FIG. 3 does not as such determine any particular time indicator as the zero point.

In accordance with the invention there is determined a certain shifted time indicator 302 and subsequent other shifted time indicators 303 which are the synchronization points for a shifted slot counter 304. The upmost line in the shifted slot counter illustrates certain slot numbers on an uplink channel of 1.544 Mbit/s, the middle line illustrates corresponding slot numbers on an uplink channel of 3.088 Mbit/s and the lowest line illustrates corresponding slot numbers on an uplink channel of 6.176 Mbit/s. The location in time of the shifted time indicator 302 in relation to the actually occurring time indicators 301 is such that between an immediately preceding actual time indicator 301 and the shifted time indicator 302 there is an offset interval that is shorter than one millisecond. The length of the offset interval comes from the Absolute_time_offset and Time_offset indicators in the following way.

The Absolute_time_offset and Time_offset indicators together give a certain total offset value which may be anything between −6 milliseconds and +6 milliseconds at steps of 100 nanoseconds. If the total offset value is zero, also the offset interval shown in FIG. 3 is zero and the shifted slot counter is synchronized to the actually occurring time indicators 301. If the total offset value is positive, the offset interval shown in FIG. 3 is equal to the decimal remainder of the total offset value. If the total offset value is negative, the offset interval shown in FIG. 3 is equal to one minus the absolute decimal remainder of the total offset value.

The "decimal remainder" definition of the offset interval means that the number of integer milliseconds in the total offset value must be accounted for in the initialization of the shifted slot counter 304. For example, if the number of integer milliseconds in the total offset value is three, the slot numbers given by the shifted slot counter must refer to an M-bit register value which is one less than if the total offset value would be between zero and one millisecond. Generally if the number of integer milliseconds in the total offset value is n, the slot numbers given by the shifted slot counter must refer to an M-bit register value which is obtained by deducting a certain datarate-dependent value (e.g. n/3) from the M-bit register value which they would refer to without the shifting (since the M-bit register value only changes by 3 ms intervals).

FIG. 4 illustrates a very simple hardware implementation that can be applied to realize the principle shown in FIG. 3. An offset counter 401 is arranged to receive the actually occurring time indicators along a first input line 402. Another input line 403 is used to initialize the offset counter 401 so that it generates the offset interval shown in FIG. 3 and described above. The output of the offset counter 401 is a train of shifted time indicators which is coupled to a first input line 404 of a shifted slot counter 405. Also to the latter there is another input line 406 which is used to set the slot numbering in order to take into account the number of integer milliseconds in the total offset value.

The shifted slot counter 405 gives at its output 407 a running slot number which includes a shift in relation to the actually occurring time indicators. The shift takes into account the total offset value given by the Absolute_time_offset and Time_offset indicators. The shifted slot numbers are coupled into a slot comparator 408 which knows the numbers of the slots which have been allocated to the cable modem for uplink transmissions. The allocations have been programmed into the slot comparator 408 through a programming input 409. Whenever a shifted slot number coming from the shifted slot counter 405 coincides with the number of an allocated uplink transmission slot, the slot comparator 408 gives a triggering signal at its output 410.

FIG. 5 illustrates schematically a cable modem according to an embodiment of the invention. Of the functional blocks shown in FIG. 5, those falling within the general designation 500 are parts of the cable modem. A bidirectional cable network interface 501 connects the cable modem to a cable network, which is not as such shown in FIG. 5. A duplexing block 502 is used to separate downlink and uplink transmissions from each other. Downlink transmissions are directed from the duplexing block 502 to a receiving, demodulating and decoding block 503 which converts the downlink transmission into a digital bit stream on the baseband frequency. This digital bit stream is lead into a downlink demultiplexer 504 which operates under the command of a control block 505. The demultiplexer distributes the different parts of the received downlink transmission so that e.g. a television program or other real-time presentation which is meant to be reproduced immediately is directed to the corresponding presentation device 506, downlink data transmissions are directed to a local data terminal 507 and control information like uplink transmission time allocations are directed to the control block 505.

At the right of FIG. 5 there is also shown a user input device 508 which means generally any input means that are available for a user to provide digital information that is to be transmitted in the uplink direction. An uplink multiplexer 509 receives inputs from said user input device 508 as well as from the local data terminal 507 and the control block 505. It composes a multiplexed uplink transmission bit stream which is fed into an uplink transmitter 510. Any coding, scrambling or other signal processing operations that are needed may be performed in either of blocks 509 and 510.

The uplink transmission triggering block 511 is the part of the cable modem 500 which is mostly affected by the invention. Most advantageously it is of the type shown in FIG. 4. It receives the time indicators from the receiving, demodulating and decoding block 503 and initialization information from the control block 505. Using the notation of FIG. 4, line 402 comes from block 503 and lines 403, 406 and 409 come from block 505. The output of the uplink transmission triggering block 511 is coupled to the uplink transmitter 510 in order to trigger the uplink transmissions at the correct time instant.

The above-given examples should not be construed to be limiting to the scope of the present invention. One alternative embodiment of the invention might be based on picking the time indicator that constitutes the first synchronization point to the shifted slot counter so that it is always at least one complete time indicator interval before the starting point of the shifted slot counter but not more that N complete time indicator intervals before it, where the positive integer N<12. In other words, the offset interval shown in FIG. 3 would be always longer than 1 ms. However, a longer offset means that the offset counter becomes bigger and its required accuracy becomes higher. Another alternative embodiment could make the slot comparator to take into account the number of integer milliseconds in the total offset value instead of the shifted slot counter: in the programming of the slot comparator a deduction of n/3 would be made from each allocated slot number for n integer milliseconds in the total offset value.

The invention claimed is:

1. A method for triggering an uplink transmission in a cable modem, comprising the steps of:
    receiving a number of time indicators in a downlink direction,
    establishing a first knowledge about a total time offset related to propagation delays in a network from which the time indicators are received,
    establishing a second knowledge about an allocated uplink transmission slot number determined in relation to the received time indicators,
    reducing the total time offset into a remainder value that is smaller than the total time offset,
    synchronizing a shifted slot counter to a shifted time base which has an offset to a time base provided by the received time indicators, said offset being equal to said remainder value, and
    generating an uplink transmission triggering signal as a response to said shifted slot counter giving a certain slot number.

2. A method according to claim 1, wherein the step of reducing the total time offset into a remainder value comprises the step of reducing the total time offset into said remainder value that is smaller than the length of time between two consecutive received time indicators.

3. A method according to claim 1, further comprising the step of adjusting the slot numbers in the shifted slot counter to take into account a difference between the total time offset and said remainder value, so that said step of generating an uplink transmission triggering signal comprises the step of generating an uplink transmission triggering signal at a coincidence between a slot number given by said adjusted shifted slot counter and the allocated uplink transmission slot number.

4. A method according to claim 1, further comprising the step of converting the allocated uplink transmission slot number into a shifted slot number to take into account the difference between the total time offset and said remainder value, so that said step of generating an uplink transmission triggering signal comprises the step of generating said uplink transmission triggering signal at a coincidence between a slot number given by said shifted slot counter and the shifted allocated uplink transmission slot number.

5. A device for triggering an uplink transmission in a cable modem, comprising:
    means for receiving a number of time indicators received in a downlink direction,
    time indicator offset counting means for generating a shifted time base which has an offset to a time base provided by the received time indicators,
    a slot counter coupled to said time indicator offset counting means so as to synchronize itself to said shifted time base, and
    triggering signal generating means coupled to said slot counter for generating an uplink transmission triggering signal from the result given by said slot counter;
    wherein a maximum counting range of said time indicator offset counting means is shorter than one time interval between successive time indicators.

6. A device for triggering an uplink transmission in a cable modem, comprising:
    means for receiving a number of time indicators received in a downlink direction,
    time indicator offset counting means for generating a shifted time base which has an offset to a time base provided by the received time indicators,
    a slot counter coupled to said time indicator offset counting means so as to synchronize itself to said shifted time base, and
    triggering signal generating means coupled to said slot counter for generating an uplink transmission triggering signal from a result given by said slot counter,
    wherein said slot counter is programmable to adjust slot numbers given so as to take into account a difference between a total time offset and a current counting range of said time indicator offset counting means, where said total time offset is an offset between a reference point within the received time indicators and a desired uplink transmission moment.

7. A device for triggering an uplink transmission in a cable modem, comprising:
    means for receiving a number of time indicators received in a downlink direction,
    time indicator offset counting means for generating a shifted time base which has an offset to a time base provided by the received time indicators,
    a slot counter coupled to said time indicator offset counting means so as to synchronize itself to said shifted time base, and
    triggering signal generating means coupled to said slot counter for generating an uplink transmission triggering signal from a result given by said slot counter.
    wherein said triggering signal generating means comprise a slot comparator for comparing slot numbers given by said slot counter against a preprogrammed slot number for generating said uplink transmission triggering signal on the basis of said comparisons.

8. A device according to claim 7, wherein said slot comparator is programmable to adjust said preprogrammed slot number so as to take into account a difference between a total time offset and a current counting range of said time indicator offset counting means, where said total time offset is an offset between a reference point within received time indicators and a desired uplink transmission moment.

9. A cable modem, comprising:
    means for receiving a number of time indicators in a downlink direction, means for receiving indicator values indicating a total time offset related to propagation delays in a network from which the time indicators are received, means for receiving an allocated uplink transmission slot number determined in relation to the received time indicators, time indicator offset counting means for generating a shifted time base which has an offset to the time base provided by the received time indicators, means for adjusting the allocated uplink transmission slot number to take into account a difference between the total time offset and an offset which said shifted time base has in relation to the time base provided by the received time indicators, a slot counter coupled to said time indicator offset counting means so as to synchronize itself to said shifted time base, and triggering signal generating means for generating an uplink transmission triggering signal from a result given by said slot counter;

wherein at least one of said slot counter and said triggering signal generating means is responsive to the output of said means for adjusting the allocated uplink transmission slot number.

10. A computer program product having instructions stored on a readable medium for causing a computer to execute a method, comprising the steps of:

receiving a number of time indicators in a downlink direction, generating a shifted time base which has an offset to a time base provided by the received time indicators, synchronizing a slot counter to said shifted time base, and generating an uplink transmission triggering signal from a result given by said slot counter;

wherein a maximum range of said offset is shorter than one time inteval between successive time indicators.

* * * * *

UNITED STATES PATENT AND TRADEMARK OFFICE
CERTIFICATE OF CORRECTION

| | |
|---|---|
| PATENT NO. | : 7,039,071 B2 |
| APPLICATION NO. | : 09/736111 |
| DATED | : December 13, 2005 |
| INVENTOR(S) | : Harri Pekonen |

It is certified that error appears in the above-identified patent and that said Letters Patent is hereby corrected as shown below:

At column 8, line 52, claim 7, line 13, please delete the "." after the word "counter" and insert --,-- therefor.

At column 10, line 14, claim 10, line 10, please delete the ":" after the word "counter" and insert --;-- therefor.

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,039,071 B2 | Page 1 of 1 |
| APPLICATION NO. | : 09/736111 | |
| DATED | : May 2, 2006 | |
| INVENTOR(S) | : Harri Pekonen | |

It is certified that error appears in the above-identified patent and that said Letters Patent is hereby corrected as shown below:

At column 8, line 52, claim 7, line 13, please delete the "." after the word "counter" and insert --,-- therefor.

At column 10, line 14, claim 10, line 10, please delete the ":" after the word "counter" and insert --;-- therefor.

This certificate supersedes Certificate of Correction issued August 29, 2006.

Signed and Sealed this

Seventh Day of November, 2006

JON W. DUDAS
*Director of the United States Patent and Trademark Office*